United States Patent
Hishinuma

(10) Patent No.: US 10,171,613 B2
(45) Date of Patent: Jan. 1, 2019

(54) CLIENT DEVICE, SERVER, RECORDING MEDIUM AND INFORMATION PROCESSING METHOD

(71) Applicant: SONY CORPORATION, Tokyo (JP)

(72) Inventor: Tomohiko Hishinuma, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 169 days.

(21) Appl. No.: 15/125,697

(22) PCT Filed: Feb. 4, 2015

(86) PCT No.: PCT/JP2015/053114
§ 371 (c)(1),
(2) Date: Sep. 13, 2016

(87) PCT Pub. No.: WO2015/166680
PCT Pub. Date: Nov. 5, 2015

(65) Prior Publication Data
US 2017/0006127 A1    Jan. 5, 2017

(30) Foreign Application Priority Data

Apr. 30, 2014   (JP) .................................. 2014-093441

(51) Int. Cl.
*H04L 29/08* (2006.01)
*H04W 4/80* (2018.01)
(Continued)

(52) U.S. Cl.
CPC .......... *H04L 67/2842* (2013.01); *G06F 12/00* (2013.01); *H04L 67/10* (2013.01);
(Continued)

(58) Field of Classification Search
CPC . H04L 67/28; H04L 67/2842; H04L 67/2885; H04L 67/10; H04L 67/104;
(Continued)

(56) References Cited

U.S. PATENT DOCUMENTS

2003/0212571 A1   11/2003 Sazawa et al.
2007/0150596 A1*   6/2007 Miller .................... G06F 21/10
                                        709/226
(Continued)

FOREIGN PATENT DOCUMENTS

JP     2003-323329 A    11/2003
JP     2004-127189 A     4/2004
(Continued)

OTHER PUBLICATIONS

International Search Report dated Apr. 28, 2015 in PCT/JP15/053114 Filed Feb. 4, 2015.

*Primary Examiner* — Ruolei Zong
(74) *Attorney, Agent, or Firm* — XSENSUS LLP

(57) ABSTRACT

A client device includes cache in which a source of content is stored, a cache information transmitting unit configured to transmit information indicating the source stored in the cache to a server managing a group of client devices capable of communicating without using an external network, an external cache acquiring unit configured to acquire, from other client devices in the group, sources of content requested to be output based on information provided by the server, and a source acquiring unit configured to, when at least a part among the sources of the content requested to be output is not acquired from the other client devices, acquire the unacquired source from a content server through the external network.

15 Claims, 13 Drawing Sheets

(51) Int. Cl.
    *G06F 12/00*     (2006.01)
    *H04W 4/00*     (2018.01)
    *H04W 4/08*     (2009.01)

(52) U.S. Cl.
    CPC ............. *H04W 4/008* (2013.01); *H04W 4/08* (2013.01); *H04W 4/80* (2018.02)

(58) Field of Classification Search
    CPC . H04L 67/1076; H04L 67/1089; G06F 12/00; H04W 4/08; H04W 4/008; H04W 4/80; H04W 84/12
    USPC .......................................................... 709/213
    See application file for complete search history.

(56) References Cited

U.S. PATENT DOCUMENTS

| | | |
|---|---|---|
| 2008/0082648 A1 | 4/2008 | Ahmed et al. |
| 2011/0185031 A1 | 7/2011 | Massoulie et al. |
| 2012/0016947 A1* | 1/2012 | Damola ................ H04L 67/104 709/206 |
| 2013/0073727 A1* | 3/2013 | Souza ..................... H04L 45/44 709/224 |
| 2013/0151626 A1* | 6/2013 | Hurst ................. H04N 7/17336 709/205 |
| 2014/0045511 A1 | 2/2014 | Li et al. |
| 2014/0164563 A1* | 6/2014 | Leekley .............. H04L 67/1074 709/217 |

FOREIGN PATENT DOCUMENTS

| | | |
|---|---|---|
| JP | 2004-185263 A | 7/2004 |
| JP | 2010-505201 A | 2/2010 |
| JP | 2011-159287 A | 8/2011 |
| JP | 2011-180820 A | 9/2011 |
| JP | 2014-509416 A | 4/2014 |
| WO | 2005/033952 A1 | 4/2005 |

* cited by examiner

FIG. 5

| ATTACHMENT ID | SOURCE URL | TIMESTAMP |
|---|---|---|
| 32:61:3C:4E:B6:05 | www.abcd.com/efgh/hijk.html | 2014/02/12 11:48:11 |
| 32:61:3C:4E:B6:05 | www.abcd.com/efgh/lmno.jpg | 2014/04/10 11:48:13 |
| 32:61:3C:4E:B6:05 | www.abcd.com/efgh/pqrs.mp3 | 2013/12/30 15:06:03 |
| 32:4E:B6:05:61:3C | www.abcd.com/efgh/hijk.html | 2014/04/10 11:35:39 |
| 32:4E:B6:05:61:3C | www.abcd.com/efgh/lmno.jpg | 2014/04/06 22:24:53 |
| 3C:4E:B6:32:61:05 | www.foo.co.jp/bar/baz.html | 2014/02/23 08:12:45 |
| 3C:4E:B6:32:61:05 | www.foo.co.jp/bar/qux.jpg | 2014/03/30 18:33:26 |

… (1)

CLIENT DEVICE, SERVER, RECORDING MEDIUM AND INFORMATION PROCESSING METHOD

TECHNICAL FIELD

The present disclosure relates to a client device, a server, a recording medium, and an information processing method.

BACKGROUND ART

Due to improvements in the maintenance of communication networks and the performance of terminal devices, opportunities to read content of web pages and so on in mobile environments are increasing. However, even though communication networks are maintained, the amount of data transmitted in a communication network which provides a mobile environment is smaller than the amount of data transmitted in a fixed environment. Therefore, a round trip time for accessing content in a mobile environment tends to be longer than a round trip time in a fixed environment.

For example, Patent Literature 1 proposes a technology for registering a relatively large amount of content data, which constitutes a web page, with a storage means as an object separate from page information and efficiently using the registered content data. With this technology, it is possible to play content data (an image and a sound) of a web page without downloading it every time and rapidly start playback of the web page. When such a technology is used, it is possible to reduce a round trip time and rapidly output content not only in a fixed environment but also in a mobile environment.

CITATION LIST

Patent Literature

Patent Literature 1: PCT International Publication No. WO 2005/033952

SUMMARY OF INVENTION

Technical Problem

However, in the technology disclosed in Patent Literature 1, when content data is not stored in a terminal device, it is necessary to acquire content data from a server through a network. Therefore, when a terminal device repeatedly accesses the same content (for example, a web page) many times, although the technology can sufficiently accelerate output of the content, it is otherwise difficult to say that it can exhibit sufficient effects.

Accordingly, the present disclosure proposes a novel and improved client device, server, recording medium, and information processing method capable of further accelerating output of content in a mobile environment.

Solution to Problem

According to the present disclosure, there is provided a client device including: a cache in which a source of content is stored; a cache information transmitting unit configured to transmit information indicating the source stored in the cache to a server managing a group of client devices capable of communicating without using an external network; an external cache acquiring unit configured to acquire, from other client devices in the group, sources of content requested to be output based on information provided by the server; and a source acquiring unit configured to, when at least a part among the sources of the content requested to be output is not acquired from the other client devices, acquire the unacquired source from a content server through the external network.

According to the present disclosure, there is provided a server including: a group managing unit configured to manage a group of client devices capable of communicating without using an external network; a cache information receiving unit configured to receive information indicating sources of content cached by the client devices in the group; and a cache information providing unit configured to provide a client device with information for the client device to acquire a source of content requested to be output from another client device in the group.

According to the present disclosure, there is provided a recording medium storing a program for causing a processor of a client device including a cache storing a source of content to implement: a function of transmitting information indicating the source stored in the cache to a server managing a group of client devices capable of communicating without using an external network; a function of acquiring sources of content requested to be output from other client devices in the group based on information provided by the server; and a function of acquiring, when at least a part among the sources of the content requested to be output is not acquired from the other client devices, the unacquired source from a content server through the external network.

According to the present disclosure, there is provided an information processing method including: managing, by a processor, a group of client devices capable of communicating without using an external network; receiving information indicating sources of content cached by the client devices in the group; and providing a client device with information for the client device to acquire a source of content requested to be output from another client device in the group.

Advantageous Effects of Invention

According to the present disclosure, as described above, it is possible to further accelerate output of content in a mobile environment.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 5 is a diagram showing an intragroup cache database (DB) retained by a management server in the first embodiment of the present disclosure.

DESCRIPTION OF EMBODIMENT(S)

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Here, description will be made in the following order.
1. First embodiment
1-1. System configuration
1-2. Functional configuration of client device
1-3. Functional configuration of management server
1-4. Example of intragroup cache DB
1-5. Example of processing flow of group management
1-6. Processing flow of content output
2. Second embodiment
3. Third embodiment
4. Hardware configuration
5. Supplement 1. First Embodiment (1-1. System Configuration)

Figure 1:
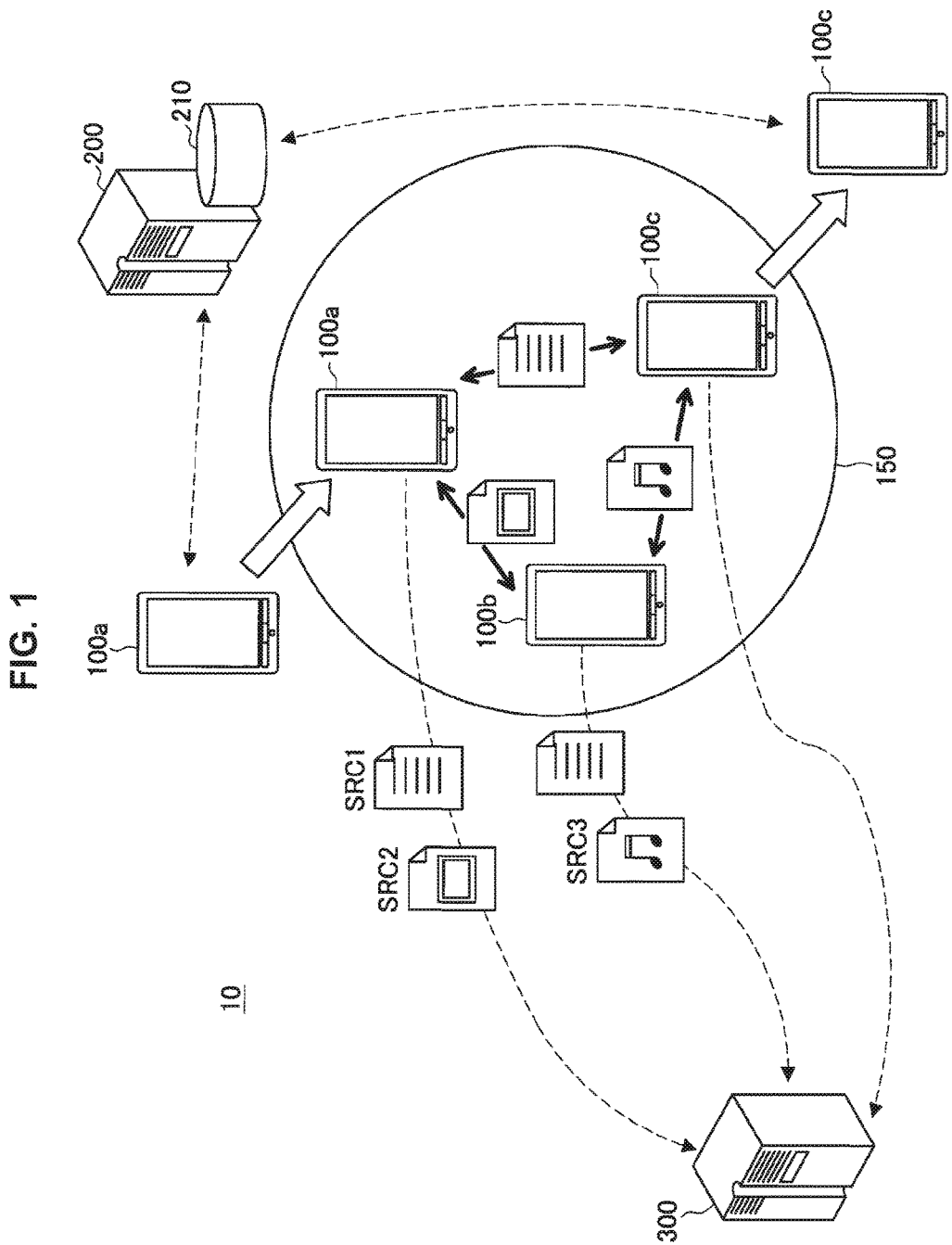
FIG. 1 is a diagram showing a schematic configuration of a system relating to a first embodiment of the present disclosure.

FIG. 1 is a diagram showing a schematic configuration of a system relating to a first embodiment of the present disclosure. Referring to FIG. 1, a system 10 includes client devices 100, a management server 200, and a content server 300.

The client devices 100 are shown as smart phones 100a to 100c, but may be various types of terminal devices having a communication function and a content output function, for example, smart phones, tablets, personal computers (PCs), wearable devices, digital cameras, media players, game machines, and so on. As will be described below, in the present embodiment, a group 150 is formed by the plurality of client devices 100 which can communicate without using an external network. The client devices 100 in the group 150 can communicate with each other by way of, for example, wireless fidelity (Wi-Fi), Bluetooth (registered trademark), or so on. Alternatively, the client devices 100 in the group 150 may also be able to communicate with each other through the management server 200.

The management server 200 manages the group 150. The management server 200 is implemented by a separate single server device on a network or a plurality of server devices which cooperate in series or parallel. The management server 200 can communicate with each of the client devices 100 in the group 150 by way of wireless communication and so on through, for example, a portable phone network. Alternatively, the management server 200 may also be able to communicate with other client devices 100 in the group by way of Wi-Fi, Bluetooth (registered trademark), and so on.

The content server 300 provides content to the client devices 100. Like the management server 200, the content server 300 is also implemented by a single server device on a network or a plurality of server devices which cooperate in series or parallel. The content server 300 can communicate with each of the client devices 100 by way of wireless communication or so on through, for example, a portable phone network. Unlike the management server 200, communication between the client devices 100 and the content server 300 passes through an external network. The external network will be described below. The content server 300 transmits sources of content to the client devices 100.

A difference between the system 10 shown in the drawing and a system 30 in a third embodiment which will be described below is in that a main communication path between the client devices 100 and the content server 300 may not necessarily pass through the management server 200. For example, as shown in FIG. 1, the client devices 100 may acquire sources of content from the content server 300 through a communication path which does not pass through the management server 200. Needless to say, the client devices 100 may acquire at least a part among sources of content through a communication path which passes through the management server 200.

More specifically, for example, the group 150 is formed at a place at which an unspecified large number of users gather and disperse, such as a station, a plaza, a building, and so on. The management server 200 is connected to, for example, a base station of a portable phone network and a Wi-Fi base station which provides a service at a target place. In this case, the Wi-Fi base station may not necessarily provide communication with the external network including the content server 300 to the client devices 100. In other words, the client devices 100 may communicate with the content server 300 through the other base station of the portable phone network while communicating with the management server 200 by way of Wi-Fi.

Meanwhile, in the drawing, a document file SRC1, an image file SRC2, and a sound file SRC3 are shown as examples of content sources, but various kinds of sources besides these files may also be transmitted from the content server 300 to the client devices 100. Content which is output from the client devices 100 by means of these sources includes, for example, a web page, an image or a sound included in a web page, an independent image or sound, and so on.

As described above, in the present specification, a part of a communication network among the client devices 100 and the content server 300 is referred to as the external network. This term refers to a communication network located outside the communication network among the client devices in the group 150. When the client devices 100 acquire a source from the content server 300 through a wireless communication network, such as a portable phone network or so on, constituting the external network, a communication speed is low (compared to a wired communication network or so on), and also a base station is congested in a region in which terminals are concentrated, which may further reduce the communication speed. When the time taken for communication for acquiring a source from the content server 300 lengthens, a time taken until output of content also lengthens.

Meanwhile, the group 150 in accordance with the present embodiment is formed by the client devices 100 which can communicate without using the external network. Accordingly, when a client device 100 acquires a source from another client device 100 in the group 150 by way of Wi-Fi, Bluetooth (registered trademark), or so on, the communication speed becomes higher than a communication speed based on a portable phone network or so on. Communication between devices is possible without passing through a base station, and even in the case of communication through a base station, a communication path is shortened. Therefore, it is difficult to reduce the communication speed due to congestion and so on. For this reason, it is possible to accelerate output of content compared to the case of acquiring a source from the content server 300.

A technology for caching and reusing a source once acquired from the content server 300 in each of the client devices 100 is already known as disclosed in PCT International Publication No. WO 2005/033952 and so on. In the present embodiment, such cache reuse is not limited to the inside of each of the client devices 100 and is expanded between, for example, client devices 100 which are at adjacent locations and thus can communicate without using the external network, thereby increasing reusable caches and accelerating output of content.

However, when the client devices 100 which can communicate with each other separately check content of each other's caches, output of content is not necessarily accelerated due to communication and processing for the checking. Accordingly, in the present embodiment, a function of the management server 200 makes it possible to share the content of the caches of the respective client devices 100 in the group.

More specifically, in the present embodiment, the management server 200 has an intragroup cache database (DB) 210. A client device (the smart phone 100*a* in the example shown in the drawing) which newly joins the group 150 notifies the management server 200 of a source cached at that point in time. At this time, the management server 200 adds an ID (for example, a uniform resource locator (URL)) of the source that is notified of to the intragroup cache DB 210 in association with an ID of the client device (the smart phone 100*a* in the example shown in the drawing) in which the source is cached.

Also, based on information stored in the intragroup cache DB 210, the management server 200 provides a cache list in which IDs of other client devices (the smart phones 100*b* and 100*c* in the example shown in the drawing) in the group 150 and IDs of sources cached by the respective other client devices are associated with each other to the client device (the smart phone 100*a* in this example) which newly joins the group 150.

Like this, in the present embodiment, the client devices 100 in the group 150 are provided with a cache list as described above in advance by the management server 200. Therefore, a client device 100 which receives a request for content output can determine whether a necessary source is cached by the client devices 100 in the group 150 and which client device 100 the source is cached in, with reference to the cache list already provided by the management server 200. In this way, the client device 100 can transmit a request directly to another client device 100 in which the source is cached by way of Wi-Fi, Bluetooth (registered trademark), or so on and receive the source provided in response to the request.

Here, when the source necessary to output content is cached neither in the client device 100 itself nor in the other client devices 100 in the group 150, the client device 100 acquires the source from the content difference content server 300. At this time, the newly acquired source may be cached by the client device 100. The client device 100 may transmit an ID of the newly cached source to the management server 200. The management server 200 adds the ID of the source that is notified of to the intragroup cache DB 210 in association with the ID of the client device 100 in which the source is cached. In addition, the management server 200 delivers information in which the added ID of the source and the ID of the client device 100 having the source cached therein are associated with each other (a difference from the previously provided cache list) to the other client devices 100 in the group 150.

Also, a client device which withdraws from the group 150 (the smart phone 100*c* in the example shown in the drawing) notifies the management server 200 of the withdrawal from the group 150. Alternatively, the management server 200 automatically detects the client device's withdrawal from the group 150. At this time, the management server 200 removes information on a source which is cached by the client device withdrawing from the group 150 (the smart phone 100*c* in the example shown in the drawing), from the intragroup cache DB 210. Also, the management server 200 transmits a notification to the client devices 100 remaining in the group 150 so that the same update is performed on information retained in the client devices 100. When the source is cached by another client device (for example, the smart phone 100*b*) in the group 150, information associated with an ID of the other client device is left.

(Example Including Plurality of Management Servers)

Figure 2:
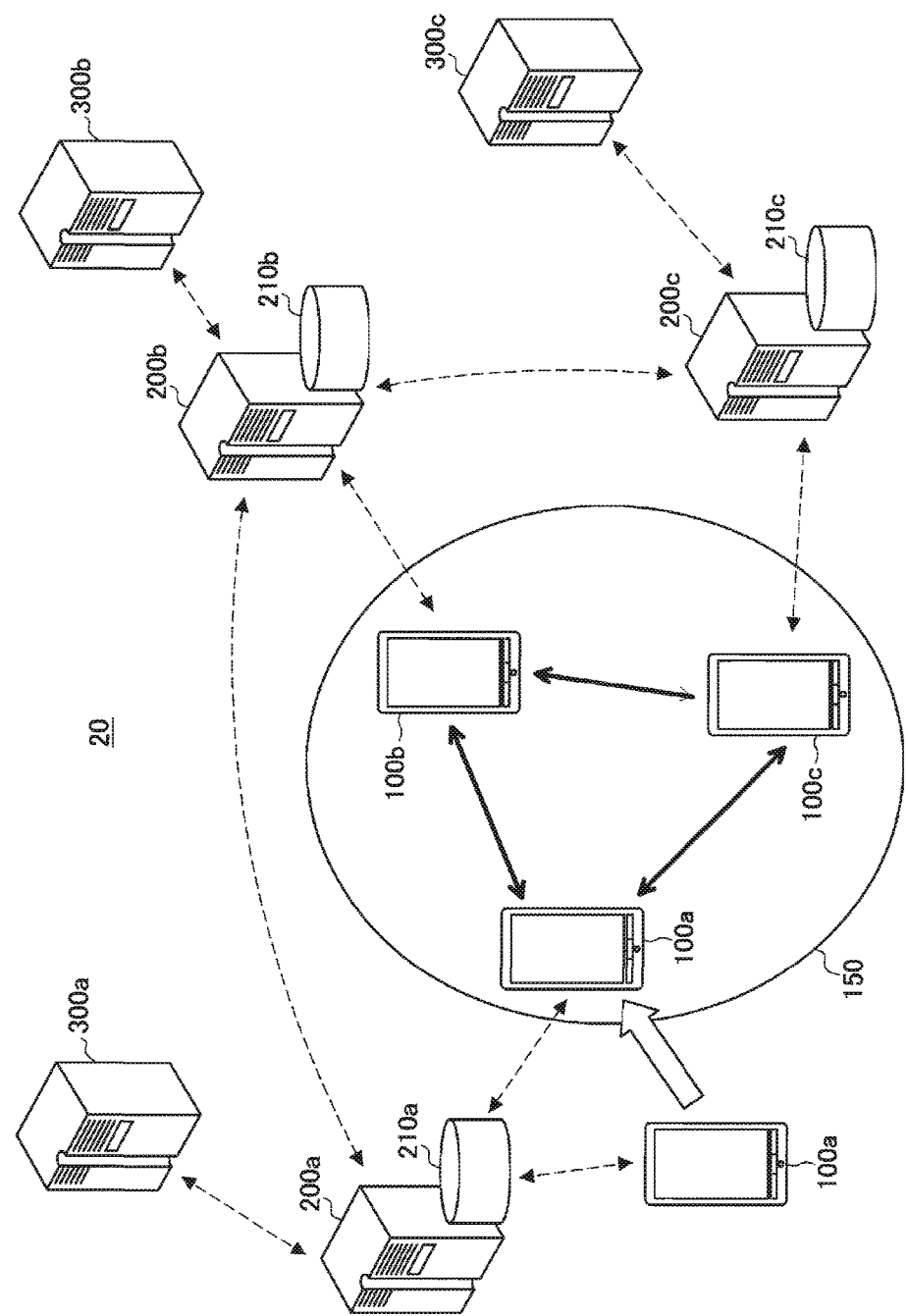
FIG. 2 is a diagram showing an example in which a plurality of management servers are included in the system shown in FIG. 1.

FIG. 2 is a diagram showing an example in which a plurality of management servers are included in the system shown in FIG. 1. Referring to FIG. 2, a system 20 includes client devices 100 (smart phones 100*a* to 100*c*), management servers 200*a* to 200*c*, and content servers 300*a* to 300*c*. In the example shown in the drawing, the management servers 200*a* to 200*c* are intermediate servers on communication paths between the smart phones 100*a* to 100*c* and the content servers 300*a* to 300*c*, respectively.

For example, when content is delivered using a contents delivery network (CDN), the client devices (the smart phones 100*a* to 100*c*) in a group 150 may acquire sources of content from the different content servers 300*a* to 300*c* through the different intermediate servers (the management servers 200*a* to 200*c*), respectively. Likewise, for example, even when the client devices in the group 150 use different service providers, a plurality of management servers 200 may exist for the same group 150.

In this case, the management servers 200*a* to 200*c* communicate with each other through a network and synchronize content of respective intragroup cache DBs 210*a* to 210*c* thereof. Communication for the synchronization may be performed regularly or when an intragroup cache DB 210 is updated in any one of the management servers 200*a* to 200*c*.

In the present embodiment, when there are a plurality of client devices 100, a plurality of management servers 200, and a plurality of content servers 300, their numbers are not limited to 3 as described above with reference to FIGS. 1 and 2 and may be two, four, or more. Also, in the example shown in FIG. 2, the client devices 100, the management servers 200, and the content servers 300 correspond to each other on a one-to-one basis, but the correspondence relation thereof may be 1:N or N:1 (N≥2). More specifically, for example, one of the plurality of management servers 200 may provide a service to a plurality of client devices 100. Also, for example, a plurality of management servers 200 or a plurality of content providing content servers 300 may provide a service to one client device 100.

(1-2. Functional Configuration of Client Device)

Figure 3:
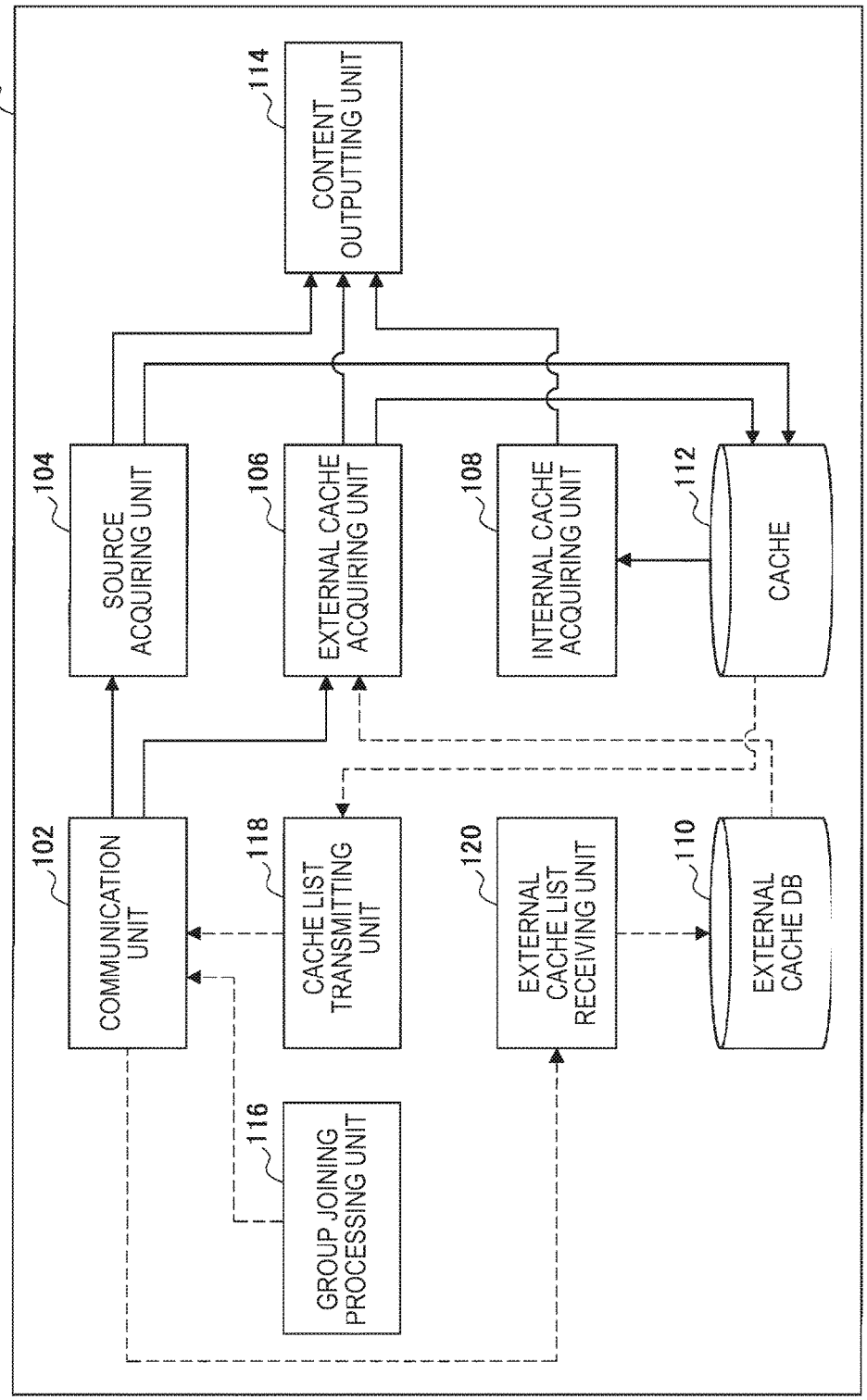
FIG. 3 is a block diagram showing a schematic functional configuration of a client device relating to the first embodiment of the present disclosure.

FIG. 3 is a block diagram showing a schematic functional configuration of a client device relating to the first embodiment of the present disclosure. Referring to FIG. 3, a client device 100 may include a communication unit 102, a source acquiring unit 104, an external cache acquiring unit 106, an internal cache acquiring unit 108, an external cache DB 110, a cache 112, a content outputting unit 114, a group joining processing unit 116, a cache list transmitting unit 118, and an external cache list receiving unit 120.

Among respective components to be described below, the external cache DB 110 and the cache 112 may be DBs stored in a memory or a storage of the client device 100. Unless stated otherwise, the components other than the external cache DB 110 and the cache 112 may be functions implemented by a processor of the client device 100 operating according to a program stored in the memory or the storage.

The communication unit 102 includes, for example, both a portable phone network communication device and a Wi-Fi or Bluetooth (registered trademark) communication device. For example, the communication unit 102 may communicate with the management server 200 and another client device 100 in the group 150 by way of Wi-Fi or Bluetooth (registered trademark) while communicating with the content server 300 through the portable phone network. Alternatively, the communication unit 102 may include, for example, a Wi-Fi communication device alone. In this case, the communication unit 102 communicates with another client device 100 in the group 150 and the management server 200 by way of Wi-Fi and also communicates with the content server 300 by way of network communication through a Wi-Fi base station (which may be the management server 200).

For example, when output of content is requested according to a user manipulation acquired by an input device (not shown), the source acquiring unit 104 requests a source from the content server 300 through the communication unit 102 and receives the source which is provided by the content server 300 in response to the request. Also, the source acquiring unit 104 acquires, from the content server 300, a source which has not been acquired by the internal cache acquiring unit 108 and the external cache acquiring unit 106. In other words, when at least a part of the source of the content which has been requested to be output is not acquired by the external cache acquiring unit 106, the source acquiring unit 104 acquires the source which has not been acquired from the content server 300. Since communication between the client device 100 and the content server 300 is performed through the external network as described above, acquisition of a source by the source acquiring unit 104 may take a longer time than acquisition of the source from another client device 100 in the group 150 by the external cache acquiring unit 106.

The external cache acquiring unit 106 acquires a source from another client device 100 in the group 150 through the communication unit 102 when output of content is requested. Also, the source acquired by the external cache acquiring unit 106 may be a source which has not been acquired from the cache 112 by the internal cache acquiring unit 108. The external cache acquiring unit 106 acquires a list of sources cached by other client devices 100 in the group 150 from the external cache DB 110 and requests the source from the other client device 100 based on the list. As will be described below, the external cache DB 110 includes information received from the management server 200 by the external cache list receiving unit 120. Also, a source cached in another client device 100 in the group 150 will be referred to, for convenience, as an external cache in the following description.

The internal cache acquiring unit 108 acquires a source stored in the cache 112 when output of content is requested. The source stored in the cache 112 is acquired in the shortest time and thus is used first at the time of content output. Also, a source stored in the cache 112 will be referred to, for convenience, as an internal cache in the following description. The sources acquired by the source acquiring unit 104 and the external cache acquiring unit 106 are provided to the content outputting unit 114 and also stored in the cache 112, so that the sources may be used as internal caches at the time of next content output.

The content outputting unit 114 outputs content based on the sources separately acquired by the source acquiring unit 104, the external cache acquiring unit 106, and the internal cache acquiring unit 108. For example, the content outputting unit 114 includes an output device, such as a display or a speaker, or driver software of the output device.

The group joining processing unit 116 transmits a request for causing the client device 100 to join the group 150. For example, when the location of the client device 100 is in a region corresponding to the group 150 (which may be a previously set region or a region dynamically set according to the location of the client device 100 in the group 150), the group joining processing unit 116 transmits the request to the management server 200 based on location information acquired using communication with the Global Positioning System (GPS) or a beacon, or so on. Further, the group joining processing unit 116 may attempt communication with another client device 100 in the group 150 and transmit a request for group joining to the management server 200 when the communication is possible. Information on the region corresponding to the group 150 or information on the other client device 100 in the group 150 may be provided by, for example, the management server 200. Also, upon transmitting the request for group joining, the group joining processing unit 116 may request a user's permission through a notification, such as an image or a sound.

When the request for causing the client device 100 to join the group 150 is transmitted by the group joining processing unit 116 and approved by the management server 200, the cache list transmitting unit 118 transmits a cache list including IDs of sources stored in the cache 112 to the management server 200 through the communication unit 102. Here, the cache list is an example of information indicating the sources stored in the cache 112. Also, when a new source is added to the cache 112 or an outdated source is removed from the cache 112, the cache list transmitting unit 118 transmits a notification including an ID of the added or removed source to the management server 200 through the communication unit 102.

The external cache list receiving unit 120 receives, through the communication unit 102, the cache list which is transmitted from the management server 200 when the client device 100 joins the group 150, and stores the received cache list in the external cache DB 110. Here, the received cache list includes IDs of other client devices 100 in the group 150 and IDs of sources cached by the respective other client devices 100. Also, the external cache list receiving unit 120 receives, through the communication unit 102, a notification which is transmitted from the management server 200 after the client device 100 joins the group 150 or when another client device 100 acquires a new cache or another client device 100 withdraws from the group 150, and updates the external cache DB 110 based on the notification.

(1-3. Functional Configuration of Management Server)

Figure 4:
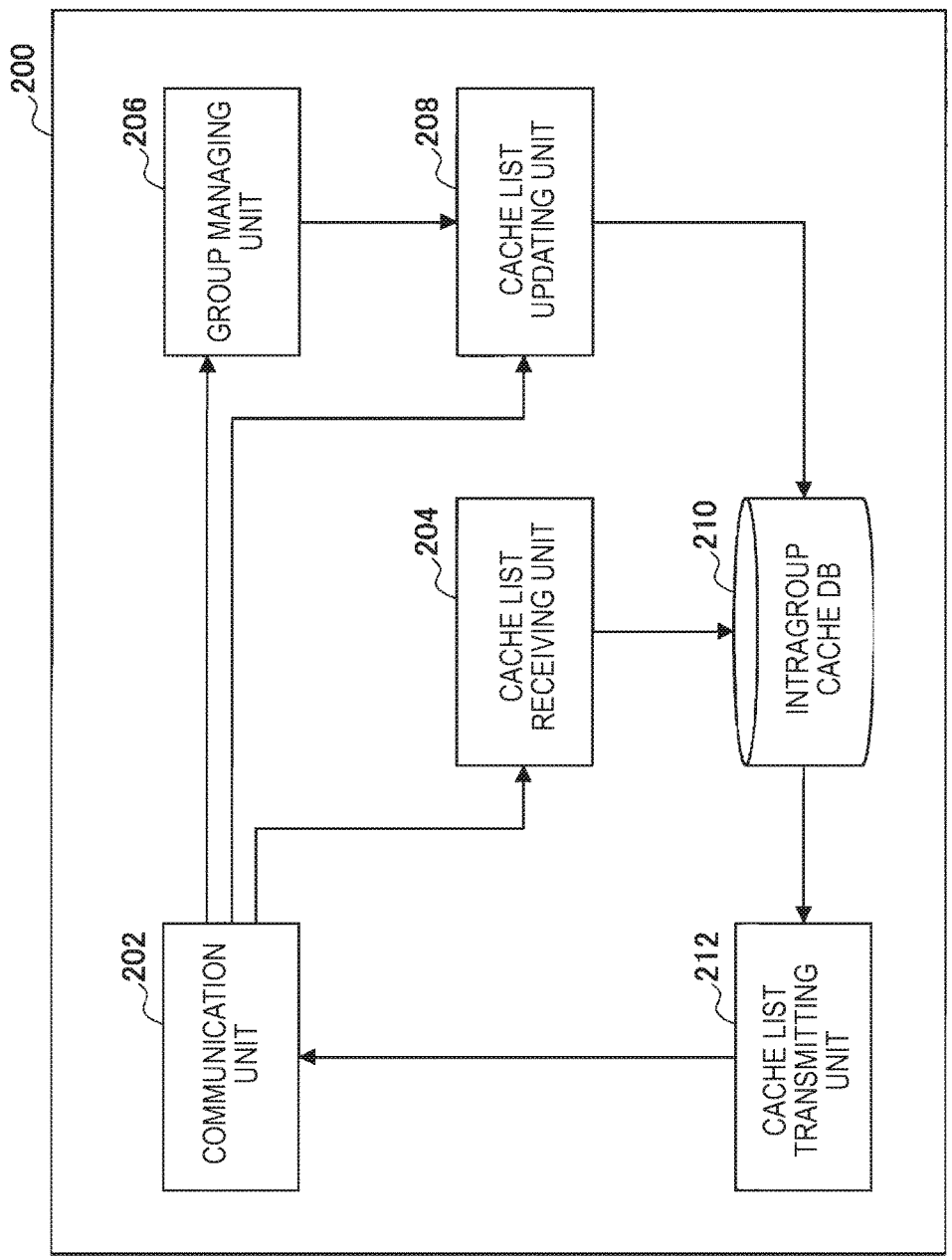
FIG. 4 is a block diagram showing a schematic functional configuration of management server relating to the first embodiment of the present disclosure.

FIG. 4 is a block diagram showing a schematic functional configuration of a management server relating to the first embodiment of the present disclosure. Referring to FIG. 4, the management server 200 may include a communication unit 202, a cache list receiving unit 204, a group managing unit 206, a cache list updating unit 208, the intragroup cache DB 210, and a cache list transmitting unit 212.

Among respective components to be described below, the intragroup cache DB 210 may be a DB stored in a memory or a storage of one or more server devices constituting the management server 200. Unless stated otherwise, the components other than the intragroup cache DB 210 may be functions implemented by a processor of the one or more server devices, which constitute the management server 200, operating according to a program stored in the memory or the storage.

The communication unit 202 includes a communication device which communicates with a client device 100 through, for example, a portable phone network, a Wi-Fi network, a Bluetooth (registered trademark) network, or so on. Here, the communication unit 202 may be able to communicate not only with the client devices 100 in the group 150 but also with a client device 100 which has not yet joined the group 150 or a client device 100 which has withdrawn from the group. Such communication with a client device 100 enables, for example, a process in which the group managing unit 206 determines whether or not the client device 100 can join the group and notifies the client device 100 that there is a joinable group 150, or a process in which the group managing unit 206 detects that the client device 100 has withdrawn from the group 150 and causes the cache list updating unit 208 to remove information of a source cached by the client device 100 having withdrawn from the intragroup cache DB 210. Further, when the management server 200 functions as an intermediate server, the communication unit 202 may communicate with the content server 300 or another intermediate server existing between the management server 200 and the content server 300 and relay communication between the client device 100 and the content server 300.

The cache list receiving unit 204 receives a cache list transmitted from the client device 100 through the communication unit 202. In the present embodiment, the cache list receiving unit 204 receives a cache list showing content sources cached by the client device 100 when the client device 100 joins the group 150. As mentioned above, the cache list includes, for example, IDs of sources stored in the cache 112 of the client device 100. The cache list receiving unit 204 stores the received cache list in the intragroup cache DB 210. More specifically, for example, the cache list receiving unit 204 adds received IDs of sources to the intragroup cache DB 210 in association with an ID of the client device which has transmitted the cache list.

The group managing unit 206 manages the group 150. As mentioned above, the group 150 is formed by client devices 100 which can communicate without using an external network. For example, the group managing unit 206 detects a client device 100 which can join the group 150 based on, for example, location information or so on provided by the client device 100 and notifies the client device 100 that there is a joinable group 150. Also, when a request to join the group 150 is received from the client device 100, the group managing unit 206 determines whether or not to permit the client device 100 to join the group. For example, based on whether the client device 100 itself or the user of the client device 100 is authorized to join the group 150, the group managing unit 206 determines whether or not to permit the client device 100 to join the group 150. Alternatively, the group managing unit 206 may recheck location information of the client device 100 and permit the client device 100 to join the group 150 when the location of the client device 100 is within a region corresponding to the group 150 and the client device 100 is also expected to continuously stay in the region.

Also, the group managing unit 206 may check location information of the client device 100, for example, regularly or when some type of request or information is transmitted from the client device 100, and determine to separate the client device 100 from the group 150 when the location of the client device 100 is expected to already be leaving or have left the region corresponding to the group 150. Further, when the group 150 is managed by a plurality of management servers 200 as shown in the example of FIG. 2, the group managing unit 206 shares information on the client devices 100 in the group 150 and information on sources cached by the respective client devices with other management servers 200 which manage the group 150.

The cache list updating unit 208 updates the intragroup cache DB 210 based on the cache list received from the client device 100 through the communication unit 202. More specifically, the cache list updating unit 208 adds, to the intragroup cache DB 210, information in which IDs of sources cached by a client device 100 having newly joined the group 150 are associated with an ID of the client device 100. Also, the cache list updating unit 208 receives, through the communication unit 202, a notification transmitted when a source is newly added to the cache 112 of the client device 100 or an outdated source is removed from the cache 112, and updates the intragroup cache DB 210 based on the notification. Further, when the group managing unit 206 detects that a client device 100 has withdrawn from the group 150, the cache list updating unit 208 removes information on a source which is associated with an ID of the client device 100 from the intragroup cache DB 210.

The cache list transmitting unit 2 transmits a cache list to the client device 100 which has newly joined the group 150 through the communication unit 202. In the present embodiment, a cache list is an example of information for a client device 100 to acquire a source of content which has been requested to be output from another client device 100 in the group 150. More specifically, for example, a cache list is generated by extracting information in which an ID of a source cached in each client device 100 is associated with an ID of the client device 100 in the group 150 from the intragroup cache DB 210. The cache list transmitted at this time may not include information on a source cached in a destination client device 100, that is, information on a source which can be used as an internal cache by the destination client device 100. Therefore, if a client device 100 newly joins the group 150, the cache list transmitting unit 212 may transmit a cache list extracted from the intragroup cache DB 210 to the client device 100 before the cache list receiving unit 204 receives a cache list.

(1-4. Example of Intragroup Cache DB)

FIG. 5 is a diagram showing an example of an intragroup cache DB retained by a management server in the first embodiment of the present disclosure. Referring to FIG. 5, the intragroup cache DB 210 includes device IDs 2101, source URLs 2103, and timestamps 2105 as items. Also, in the example shown in the drawing, records 2100a to 2100g are included in the intragroup cache DB 210.

The device IDs 2101 are IDs of client devices 100 in the group 150. In the example shown in the drawing, the device IDs 2101 are expressed in a form similar to media access control (MAC) addresses, but in other examples, any kinds of IDs, such as addresses of different layers, IDs allocated in the system 10, arbitrary names given by users, or so on, may be used.

The source URLs 2103 are IDs of sources cached in respective client devices 100. In the example shown in the drawing, the source URLs 2103 are, for example, URLs of the times when respective sources are acquired from the content server 300. In another example, any kinds of IDs, for example, shortened URLs obtained by hashing the source URLS 2103 according to a predetermined protocol, may be used. When shortened URLs are used, the size of a cache list can be reduced, and privacy of users can also be protected because a URL of a source cached by each client device 100 is expressed in an unreadable form.

A client device 100 which acquires a cache list extracted from the intragroup cache DB 210 can determine whether or not a necessary source is cached in other client devices 100 in the group 150 based on the source IDs 2103 and the device IDs 2101 included in the cache list, and also determine which client device 100 the source is cached in.

When the same source is cached by a plurality of client devices 100 in the group 150, a plurality of records 2100 associated with IDs of the respective client devices 100 are generated in the intragroup cache DB 210 (in the example shown in the drawing, the presence of the same source cached in different client devices 100 is shown by the record 2100a and the record 2100d and by the record 2100b and the record 2100e).

The timestamps 2105 show times relating to caching of respective sources. For example, the timestamps 2105 may show times at which the client devices 100 have acquired the sources from the content server 300 or times at which the sources have been stored in the caches 140 of the client devices 100. In this case, when transmitting internal cache lists to the management server 200, the client devices 100 transmit the timestamps 2105 also. In this case, when the same source is cached in a plurality of client devices 100 in the group 150 (in the example shown in the drawing, the presence of the same source cached in different client devices 100 is shown by the record 2100a and the record 2100d and by the record 2100b and the record 2100e), the timestamps 2105 can be used to determine which source is the latest.

Alternatively, the timestamps 2105 may show times at which internal cache lists or notifications of addition of sources to internal caches have been transmitted from client devices 100 to the management server 200. In this case, the timestamps 2105 may not be included in information transmitted from the client devices 100 to the management server 200. For example, when each client device 100 is continuously in the group 150 and a client device 100 in the group 150 acquires many sources from the content server 300, or a client device 100 provides the management server 200 with information on sources continuously acquired even while the client device 100 is not in the group 150 like in a modified example which will be described below, it is possible to determine which source is the latest based on the timestamps 2105 even with the configuration as described above.

(1-5. Example of Processing Flow of Group Management)
(Processing of Client Device)

Figure 6:
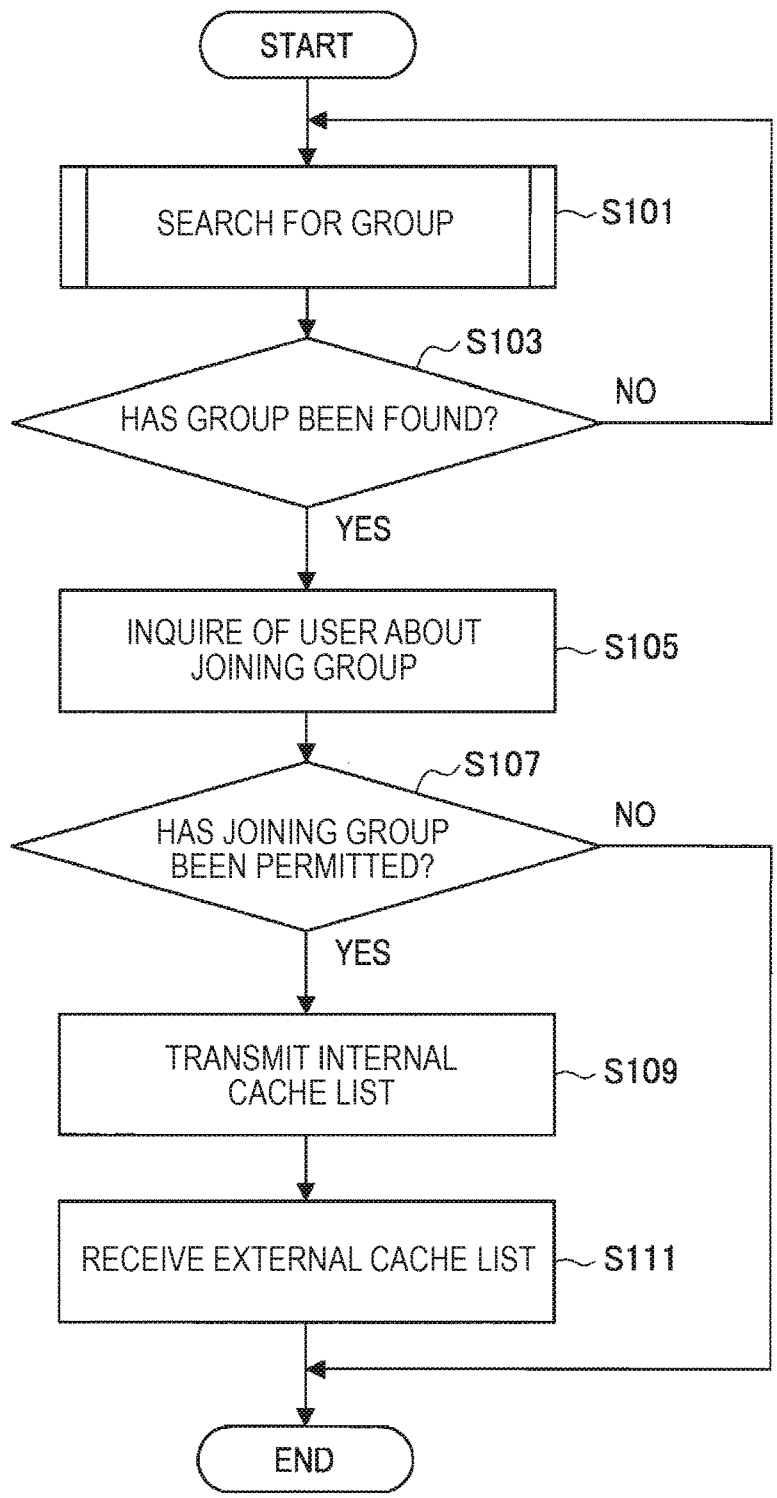
FIG. 6 is a flowchart illustrating an example of a process at a client device which newly joins a group in the first embodiment of the present disclosure.

FIG. 6 is a flowchart illustrating an example of a process at a client device which newly joins a group in the first embodiment of the present disclosure. Referring to FIG. 6, first, the group joining processing unit 116 in a client device 100 performs a joinable group searching process (S101). Details of the group searching process will be described below with reference to FIG. 7. The group joining processing unit 116 continuously performs the group searching process until a joinable group is found (S103).

When a joinable group is found, the group joining processing unit 116 inquires of a user about joining the group (S105). For example, the group joining processing unit 116 causes a display of the client device 100 to display a dialogue for confirming joining of the group. Likewise, the group joining processing unit 116 may inquire of the user about joining the group through a sound, a predetermined pattern of vibration, or so on. When the user permits in advance joining a joinable group when the joinable group is found, processing of S105 and S107 relating to the confirmation and the permission may be omitted.

When it is confirmed in S105 that joining the group has been permitted by the user (YES at S107), the cache list transmitting unit 118 transmits an internal cache list together with a request for joining the group to the management server 200 through the communication unit 102 (S109). Here, the internal cache list is a list including an ID of a source stored in the cache 112 of the client device 100. Further, the external cache list receiving unit 120 receives an external cache list from the management server 200 through the communication unit 102 (S111). Information included in the received external cache list and in which IDs of other client devices 100 in the group 150 and IDs of sources cached in the respective other client devices 100 are associated with each other is stored in the external cache DB 110.

Through the processing described above, the client device 100 can join the group 150 and use the sources cached by the other client devices 100 in the group 150 as external caches.

Figure 7:
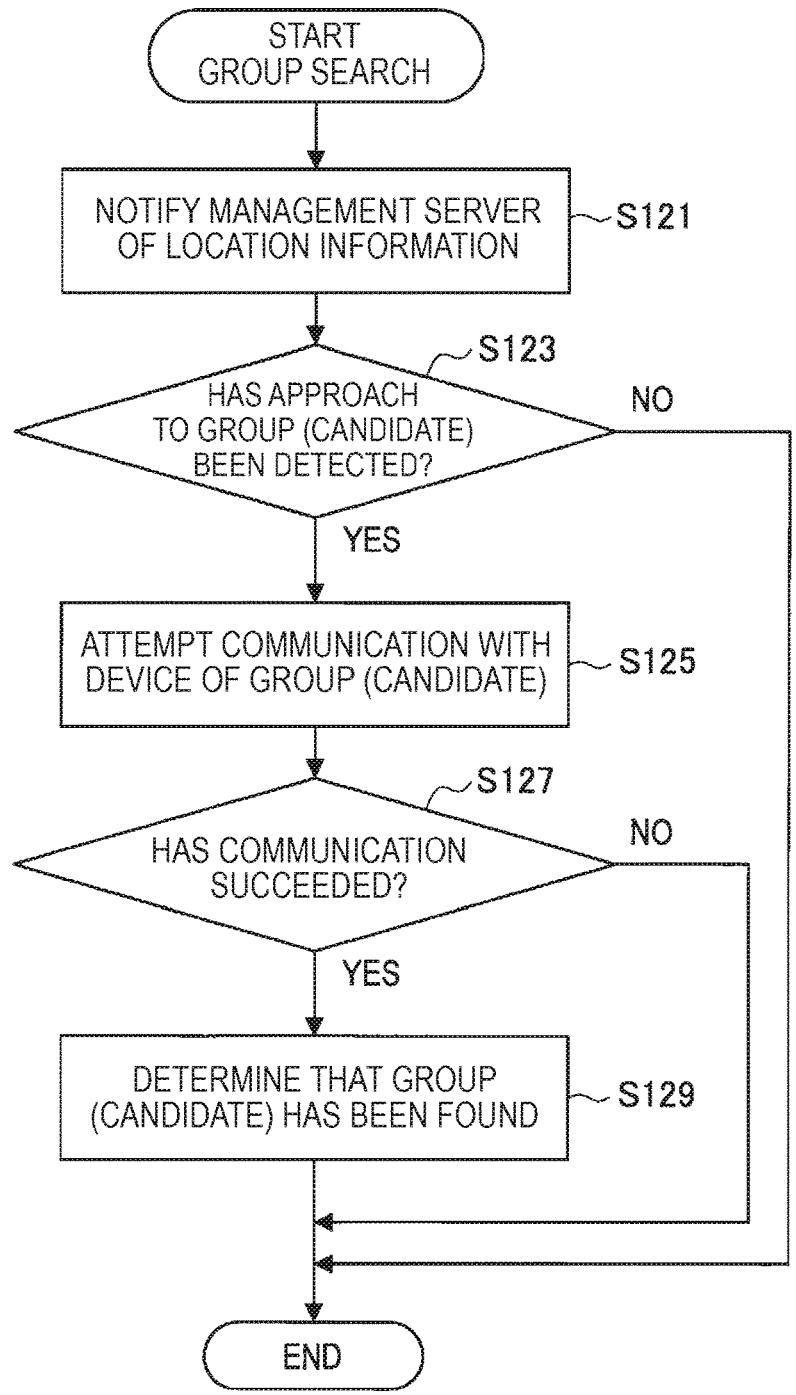
FIG. 7 is a flowchart illustrating in further detail a group searching process shown in FIG. 6.

FIG. 7 is a flowchart illustrating in further detail the group searching process shown in FIG. 6. Referring to FIG. 7, the group joining processing unit 116 of the client device 100 notifies the management server 200 of location information of the client device 100 which is acquired using communication with the GPS or a beacon, or so on through the communication unit 102 (S121). In the management server 200, the group managing unit 206 receives the location information and determines whether or not the client device 100 can join the group 150. More specifically, the group managing unit 206 determines whether the client device 100 approaches the group 150 based on a region which has been defined in advance for the group 150, location information of other client devices 100 constituting the group 150, and so on. The client device 100 is notified of the determination result, and the group joining processing unit 116 determines whether or not the approach of the client device 100 to the group 150 has been detected based on a response from the management server 200 (S123).

Here, the group 150 may have been formed already or may not have been formed yet. For example, the group 150 may be generated when there are a predetermined number or more of client devices 100 in the region defined in advance. Alternatively, when no region has been defined in advance and a predetermined number or more of client devices 100 approach each other, the group 150 may be generated to have the vicinity of these client devices 100 as a region. In such a case, in S123 described above, not only the approach to the existing group 150 but also whether or not the approach to another client device 100 which is a candidate for a group 150 that does not yet exist has been detected may be determined.

When it is detected in S123 described above that the client device 100 has approached the group 150 (or the other client device 100 which is the candidate), the group joining processing unit 116 attempts communication with another client device 100 in the group 150 or the other client device 100 which is a candidate for a group 150. The communication may be performed according to, for example, the same communication method as will be used to exchange sources later, for example, Wi-Fi, Bluetooth (registered trademark), or so on. An ID of the counterpart client device 100 with which the communication is attempted is provided by, for example, the management server 200.

Further, the group joining processing unit 116 determines whether or not the attempt at communication of S125 described above has succeeded (S127). When the communication has succeeded, the group joining processing unit 116 determines that the joinable group 150 (or the other client device 100 which is the candidate) has been found (S129), and continues the process described above with reference to FIG. 6. Meanwhile, when the approach to the group 150 or the candidate has not been detected in S123 or the communication with the group 150 or the candidate client device 100 has not succeeded in S127, the group joining processing unit 116 determines that the group 150 or the candidate has not yet been found and performs the group searching process again as shown in FIG. 6.

(Processing of Management Server)

Figure 8:
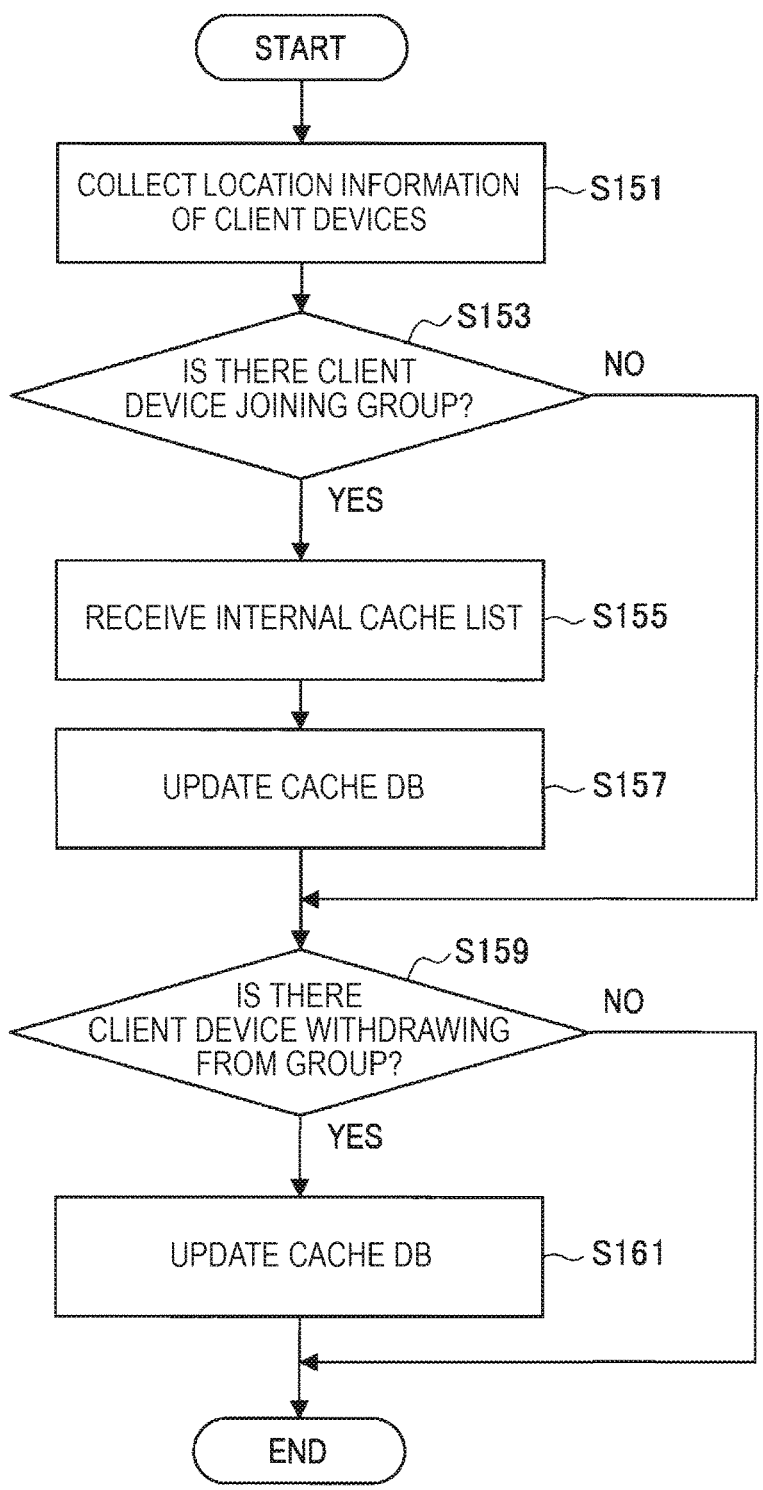
FIG. 8 is a flowchart illustrating a process of a management server accepting joining of a client device in a group in the first embodiment of the present disclosure.

FIG. 8 is a flowchart illustrating a process of a management server accepting joining of a client device in a group in the first embodiment of the present disclosure. Referring to FIG. 8, in the management server 200, the group managing unit 206 collects location information of client devices 100 through the communication unit 202 (S151). Here, targets from which the location information is collected include client devices 100 not in the group 150 as well as client devices 100 in the group 150. More specifically, for example, the group managing unit 206 may collect location information from client devices 100 which communicate through one or more base stations covering a region wider than the region corresponding to the group 150. Alternatively, the group managing unit 206 may collect location information from all client devices 100 which use a service provided by the management server 200.

Based on the location information collected in S151 described above or so on, the group managing unit 206 determines whether or not there is a client device 100 newly joining the group 150 (S153). When there is a client device 100 joining the group 150, the cache list receiving unit 204 receives an internal cache list transmitted by the client device 100 through the communication unit 202 (S155). Also, the cache list receiving unit 204 updates the intragroup cache DB 210 based on the received internal cache list (S157).

Further, based on the location information collected in S151 described above or so on, the group managing unit 206 determines whether or not there is a client device 100 withdrawing from the group 150 (S159). More specifically, for example, when a client device 100 is indicated to have withdrawn or intend to withdraw from the region corresponding to the group 150 by the location information, the client device 100 is caused to withdraw from the group 150. When there is a client device 100 withdrawing from the group 150, the cache list updating unit 208 updates the intragroup cache DB 210 based on information provided by the group managing unit 206 (S161). More specifically, the cache list updating unit 208 removes information on a source cached in the client device 100.

When the intragroup cache DB 210 is updated in S157 or S161 described above, the cache list transmitting unit 212 delivers information corresponding to a difference made by the update to client devices 100 in the group 150.

Due to the processing described above, it is possible to accept new joining of a client device 100 in the group 150 and appropriately manage the intragroup cache DB 210 according to a change in client devices 100 in the group 150.

(1-6. Processing Flow of Content Output)

Figure 9:
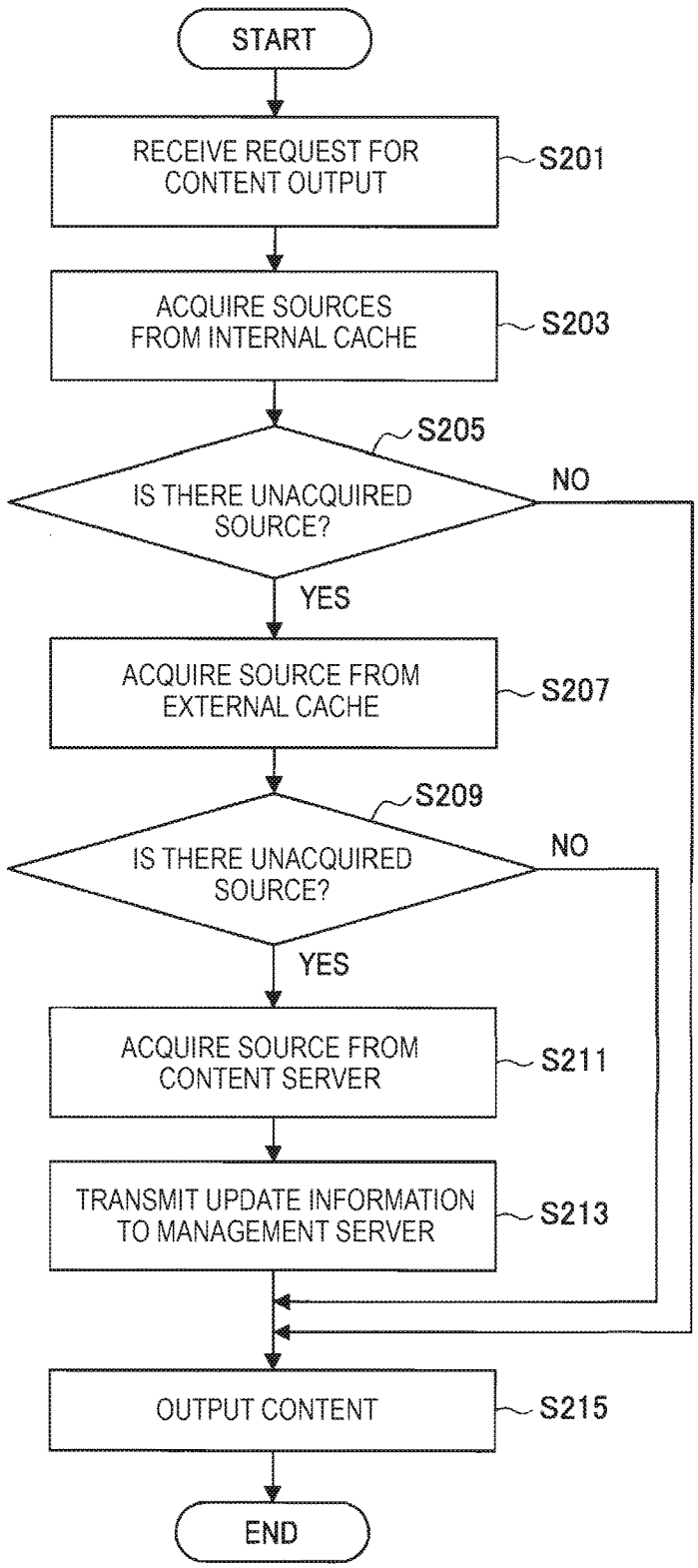
FIG. 9 is a flowchart illustrating an example of a process of a client device outputting content in the first embodiment of the present disclosure.

FIG. 9 is a flowchart illustrating an example of a process of a client device outputting content in the first embodiment of the present disclosure. Referring to FIG. 9, a client device 100 first receives a request for content output according to a user manipulation acquired by the input device (S201). Content to be output is specified by, for example, a URL or so on. At this time, in the client device 100, the internal cache acquiring unit 108 first acquires sources from the internal cache (S203). More specifically, the internal cache acquiring unit 108 acquires necessary sources among sources stored in the cache 112.

Next, the external cache acquiring unit 106 determines whether or not there is an unacquired source, that is, a source not stored in the cache 112, among the necessary sources (S205), and when there is an unacquired source, acquires the unacquired source from an external cache (S207). More specifically, the external cache acquiring unit 106 determines whether or not a necessary source is cached in another client device 100 in the group 150 with reference to the external cache DB 110, and requests a necessary source from another client device 100 through the communication unit 102 when the necessary source is cached in the other client device 100.

Further, the source acquiring unit 104 determines whether or not there is an unacquired source, that is, a source neither stored in the cache 112 nor cached in other client devices 100 in the group 150, among the necessary sources (S209), and when there is an unacquired source, acquires the unacquired source from the content server 300 (S211). At this time, the source newly acquired from the content server 300 is stored in the cache 112. The cache list transmitting unit 118 transmits update information indicating addition of the source to the management server 200 through the communication unit 102 (S213). Subsequently, based on the sources acquired in S203, S207, and S211 described above, the content outputting unit 114 outputs the content (S215). Since there is no correlation between the processing of S213 and the processing of S215, any processing may be performed first.

According to the process described above, it is possible to accelerate output of content whose sources are cached by other client devices 100 in the group 150 as well as content whose sources have already been cached by the client device 100 (the internal cache can be used) using the caches of these devices as external caches.

Thus far, the first embodiment of the present disclosure has been described. In the present embodiment, information cached by client devices 100 other than a client device 100 in the group 150 is provided from the management server 200 to the client device 100 as, for example, a list. When outputting content, the client device 100 can specify another client device 100 in the group 150 in which a necessary source is cached according to the information which has been provided in advance by the management server 200 and request the source from the other client device 100. In the present embodiment, when such a client device 100 uses an external cache, communication with the management server 200 does not occur. Therefore, for example, even in a situation in which communication with the management server 200 is unstable or a bottleneck in communication with the management server 200 occurs, it is possible to accelerate output of content using an external cache.

Modified Example

In the above example, when a client device 100 joins the group 150, the cache list transmitting unit 118 in the client device 100 transmits a cache list to the management server 200, but embodiments of the present disclosure are not limited to such an example.

For example, even when the client device 100 is not in the group 150, the cache list transmitting unit 118 may transmit a cache list or a notification of an update to the management server 200. In this case, information on caches of client devices 100 in the group 150 and client devices 100 not in the group 150 is included in the intragroup cache DB 210 of the management server 200.

In this case, when the client device 100 newly joins the group, the group managing unit 206 updates the intragroup cache DB 210 through the cache list updating unit 208 based on a request which is transmitted by the group joining processing unit 116 to the management server 200 through the communication unit 102, and validates information on sources cached in client devices 100 in the group. Meanwhile, when the client device 100 withdraws from the group or cache information is provided from a client device 100 not in the group, the cache list receiving unit 204 or the group managing unit 206 invalidates information on a source cached in the client device 100 in the intragroup cache DB 210.

In the case of the modified example described above, the amount of data accumulated in the management server 200 increases, but it is not necessary for the client device 100 to exchange cache lists when joining the group 150. Therefore, it is possible to accelerate a process of joining the group 150. Also, when the management server 200 manages a plurality of groups 150 and a user moves between the groups 150, it is possible to simplify processing at the time of coming in and out of the respective groups 150.

2. Second Embodiment

Next, a second embodiment of the present disclosure will be described. The present embodiment differs from the first embodiment described above in a point which will be described below with reference to FIGS. 10 and 11 but is the same as the first embodiment in other points, and thus repeated descriptions will be omitted.

Figure 10:
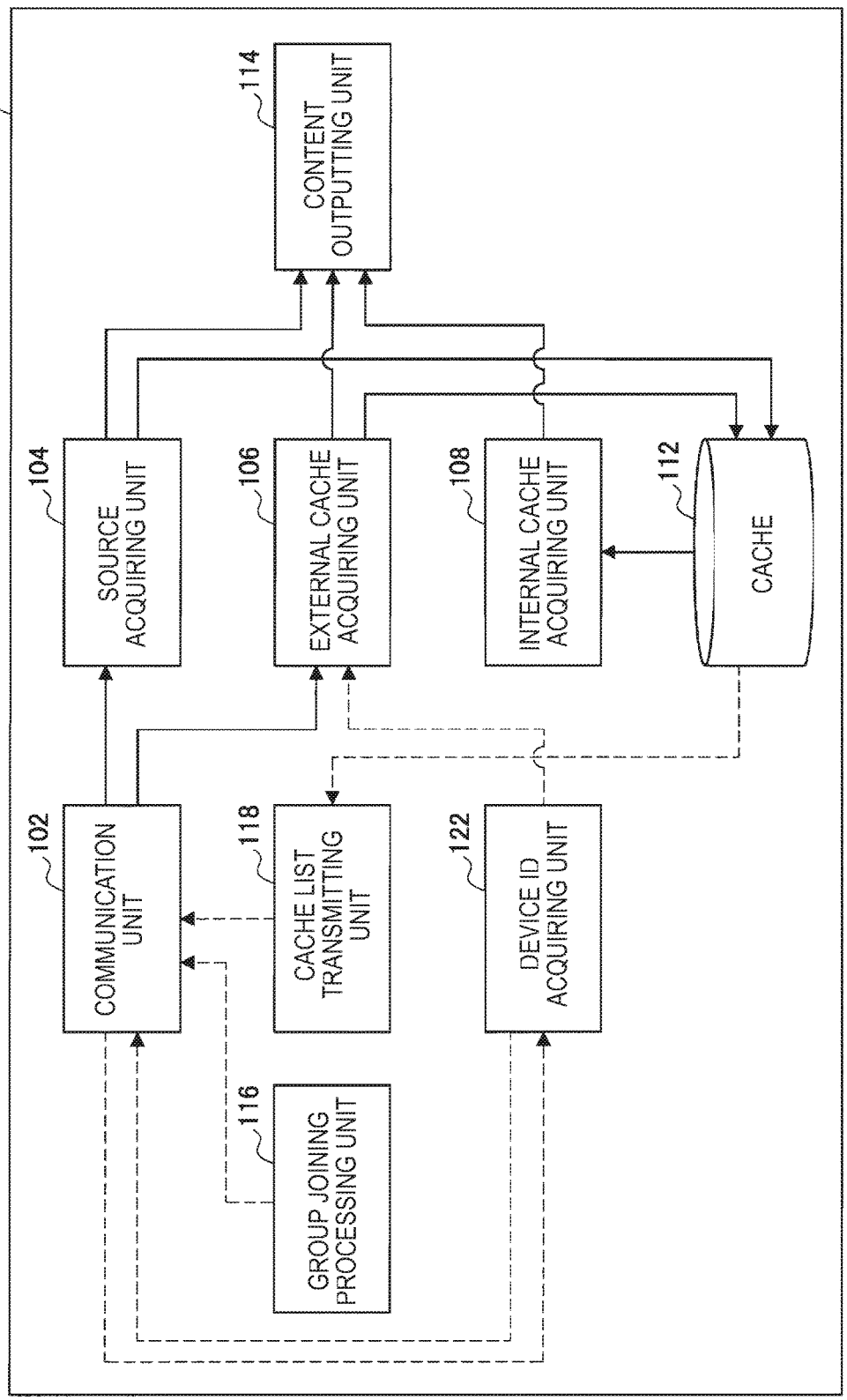
FIG. 10 is a block diagram showing a schematic functional configuration of a client device relating to a second embodiment of the present disclosure.

FIG. 10 is a block diagram showing a schematic functional configuration of a client device relating to the second embodiment of the present disclosure. Referring to FIG. 10, a client device 100 may include a communication unit 102, a source acquiring unit 104, an external cache acquiring unit 106, an internal cache acquiring unit 108, a cache 112, a content outputting unit 114, a group joining processing unit 116, a cache list transmitting unit 118, and a device ID acquiring unit 122. Since they are the same components as those of the first embodiment described above excluding the device ID acquiring unit 122, repeated descriptions will be omitted.

The device ID acquiring unit 122 may be a function which is implemented by, for example, a processor of the client device 100 operating according to a program stored in a memory or a storage. When output of content is requested, the device ID acquiring unit 122 acquires IDs of other client devices 100 in the group 150 in which sources of the content are cached from the management server 200 through the communication unit 102. More specifically, when at least a part of a necessary source of the content is not acquired by the internal cache acquiring unit 108 at the time of content output, the device ID acquiring unit 122 transmits a request including an ID of the unacquired source to the management server 200. When a client device 100 in which a source indicated by the ID included in the request is cached is in the group 150, the management server 200 replies with an ID of the client device 100. The device ID acquiring unit 122 provides the ID of the client device 100 received from the management server 200 to the external cache acquiring unit 106, and the external cache acquiring unit 106 requests the source from the other client device 100 in the group 150 based on the ID.

Figure 11:
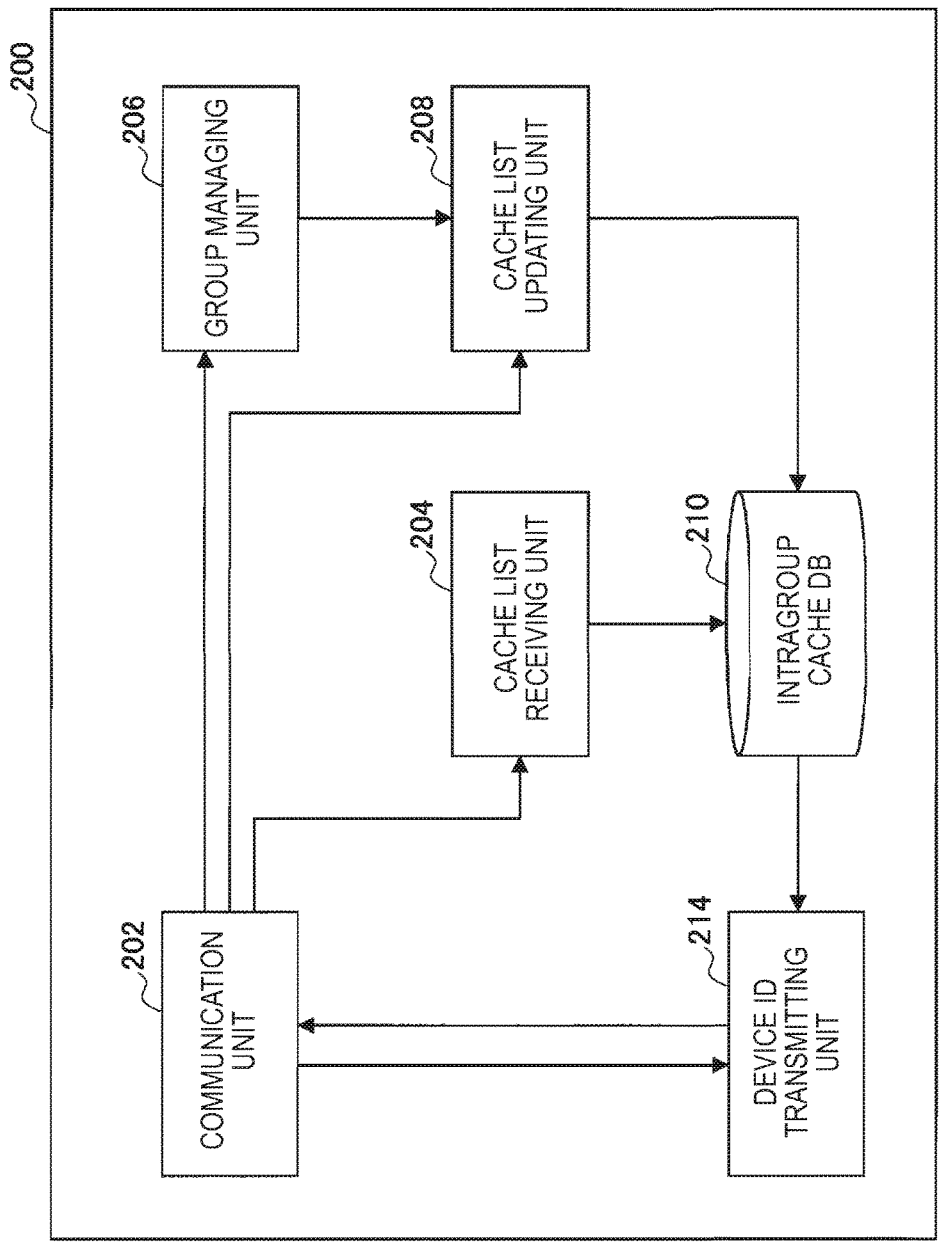
FIG. 11 is a block diagram showing a schematic functional configuration of a management server relating to the second embodiment of the present disclosure.

FIG. 11 is a block diagram showing a schematic functional configuration of a management server relating to the second embodiment of the present disclosure. Referring to FIG. 11, the management server 200 may include a communication unit 202, a cache list receiving unit 204, a group managing unit 206, a cache list updating unit 208, an intragroup cache DB 210, and a device ID transmitting unit 214. Since they are the same components as those of the first embodiment described above excluding the device ID transmitting unit 214, repeated descriptions will be omitted.

The device ID transmitting unit 214 may be a function which is implemented by, for example, a processor of one or more server devices, which constitute the management server 200, operating according to a program stored in a memory or a storage. When a request including an ID of a source is received from a client device 100 through the communication unit 202, the device ID transmitting unit 214 searches the intragroup cache DB 210. When the source indicated by the ID is found, the device ID transmitting unit 214 transmits an ID of another client device 100 in the group 150 in which the source is cached to the client device 100 through the communication unit 202.

In the second embodiment of the present disclosure described above, when a client device 100 outputs content, the client device 100 transmits a request including an ID of a necessary source to the management server 200. In response to this, the management server 200 provides an ID of another client device 100 in the group 150 in which the necessary source is cached to the client device 100.

In the present embodiment, the client device 100 does not acquire in advance a list of sources cached by other client devices 100 in the group 150 from the management server 200, but at the time of content output, transmits a request including an ID of a necessary source and requests a source from another client device 100 in the group based on an ID of the other client device 100 which is provided by the management server 200 in response to the request.

In this way, although it takes time to inquire of the management server 200 at the time of content output, information exchanged when the client device 100 joins the group 150 is little. Also, every time the intragroup cache DB 210 is updated in the management server 200, it is unnecessary to transmit a notification for an update of an external cache DB to a client device 100 in the group 150. In other words, in the present embodiment, when the intragroup cache DB 210 of the management server 200 is only maintained in the latest state, client devices 100 in the group 150 can appropriately use sources cached in each other.

The second embodiment described above is appropriate for a case in which, for example, there are a large number of client devices 100 in the group 150 or a large amount of sources are cached in each client device 100. In such a case, it may be rational to transmit requested information in units of sources when a need occurs in a client device 100 rather than to transmit information on all sources when a client device joins the group 150. Also, even when the caches 112 of client devices 100 in the group 150 are frequently updated, those updates can be applied to only the intragroup cache DB 210 of the management server 200, and thus the present embodiment is advantageous.

3. Third Embodiment

Next, a third embodiment of the present disclosure will be described. The present embodiment differs from the first embodiment and the second embodiment described above in a point which will be described below with reference to FIG. 12 but is the same as the first or second embodiment in other points, and thus repeated descriptions will be omitted.

Figure 12:
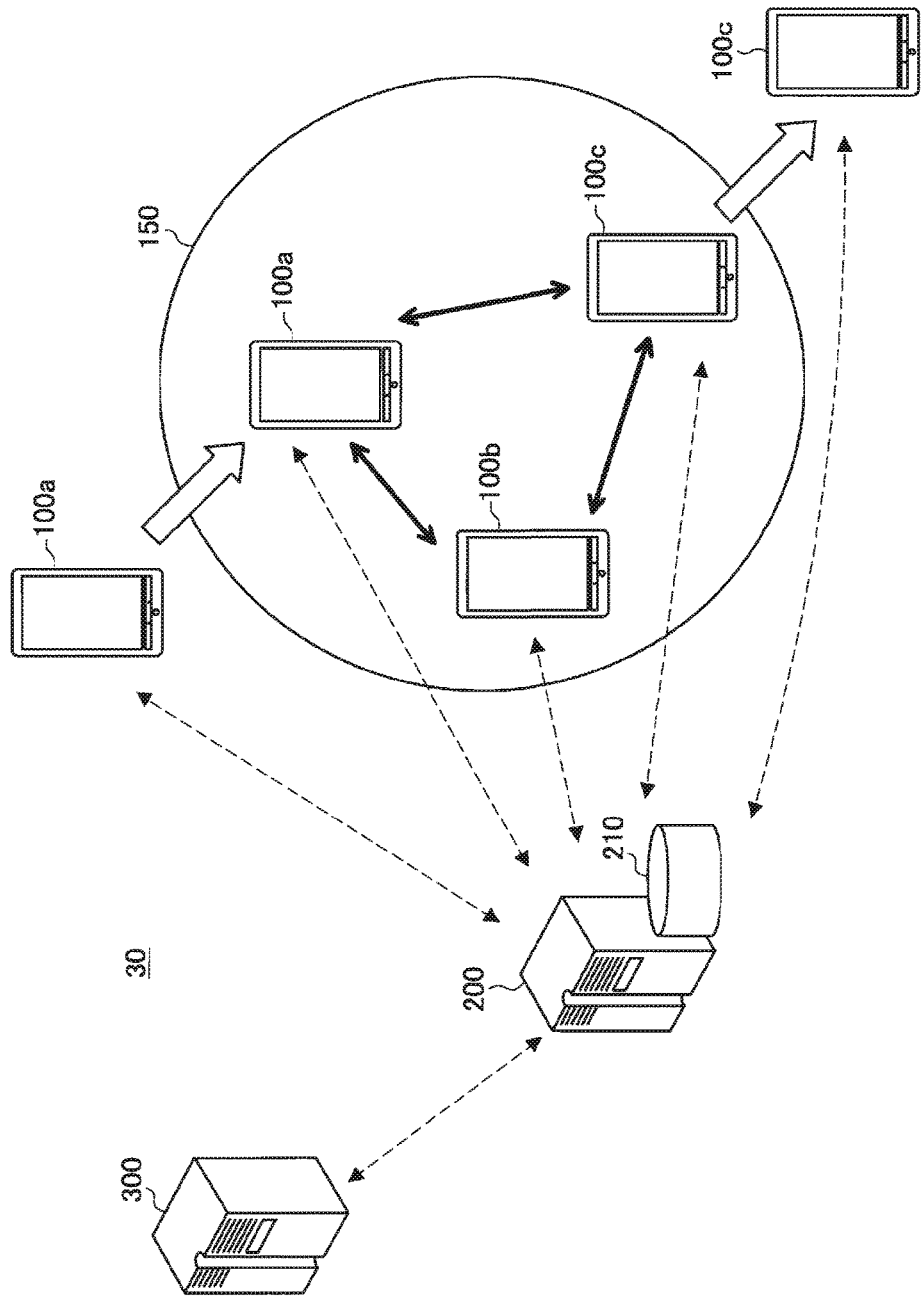
FIG. 12 is a diagram showing a schematic configuration of a system relating to a third embodiment of the present disclosure.

FIG. 12 is a diagram showing a schematic configuration of a system relating to the third embodiment of the present disclosure. Referring to FIG. 12, a system 30 includes client devices 100, a management server 200, and a content server 300.

A difference from the systems 10 and 20 relating to the first embodiment described above with reference to FIG. 1 and FIG. 2 is that, in the system 30, the client devices 100 (smart phones 100a to 100c here) mainly communicate with the content server 300 through the management server 200 which is an intermediate server also. In other words, in the present embodiment, the client devices 100 in the group 150 and the intermediate server (the management server 200) form a closed communication network, and it is possible to access an external network including the content server 300 through the intermediate server (the management server 200). Such a network is seen in an environment in which it is difficult to access a network through a common portable phone network or so on, such as the inside of an airplane, the inside of a high speed train, or so on.

For a more specific description for facilitating understanding of effects of the present embodiment, for example, inside an airplane, a client device 100 is connected to the intermediate server (the management server 200) by way of Wi-Fi, and the intermediate server (the management server 200) accesses the external network of the content server 300 and so on by way of satellite communication or so on. Also, inside a high speed train, a client device 100 is connected to the management server 200 by way of Wi-Fi, and the intermediate server (the management server 200) accesses the external network of the content server 300 and so on via communication equipment provided in railroad facilities or so on.

In such an environment, the amount of traffic of satellite communication or so on between the intermediate server (the management server 200) and the external network is limited, and thus each client device 100 may not obtain sufficient communication speed. Accordingly, in the present embodiment, the intermediate server which is connected to client devices 100 in the group 150 corresponding to the inside of an airplane or a train is set as the management server 200, and when each client device 100 can use an external cache (the cache of another client device 100 in the group 150) at the time of content output, by not communicating with the external network, the amount of traffic at a part, such as satellite communication or so on, in which a bottleneck may occur is reduced as much as possible.

Also, for example, while a high speed train is stopped at a station, a client device 100 may be able to temporarily access the content server 300 not through the intermediate server (the management server 200) but through a portable phone network or so on. When almost all communication between the client device 100 and the content server 300 is performed through the intermediate server (the management server 200) with such a short temporary time or without any such temporary time, the management server 200 can find a source newly acquired by the client device 100 by interpreting a request transmitted by the client device 100 to the content server 300. Therefore, in such a case, a notification to the management server 200 may be omitted when the client device 100 acquires a new source from the content server 300.

In addition, in the example shown in the drawing, the intermediate server and the management server 200 in the system 30 are shown to be the same device, but the present embodiment is not limited to such an example. For example, the management server 200 and the intermediate server may be successively disposed in series on a network which connects client devices 100 and the content server 300.

4. Hardware Configuration

Figure 13:
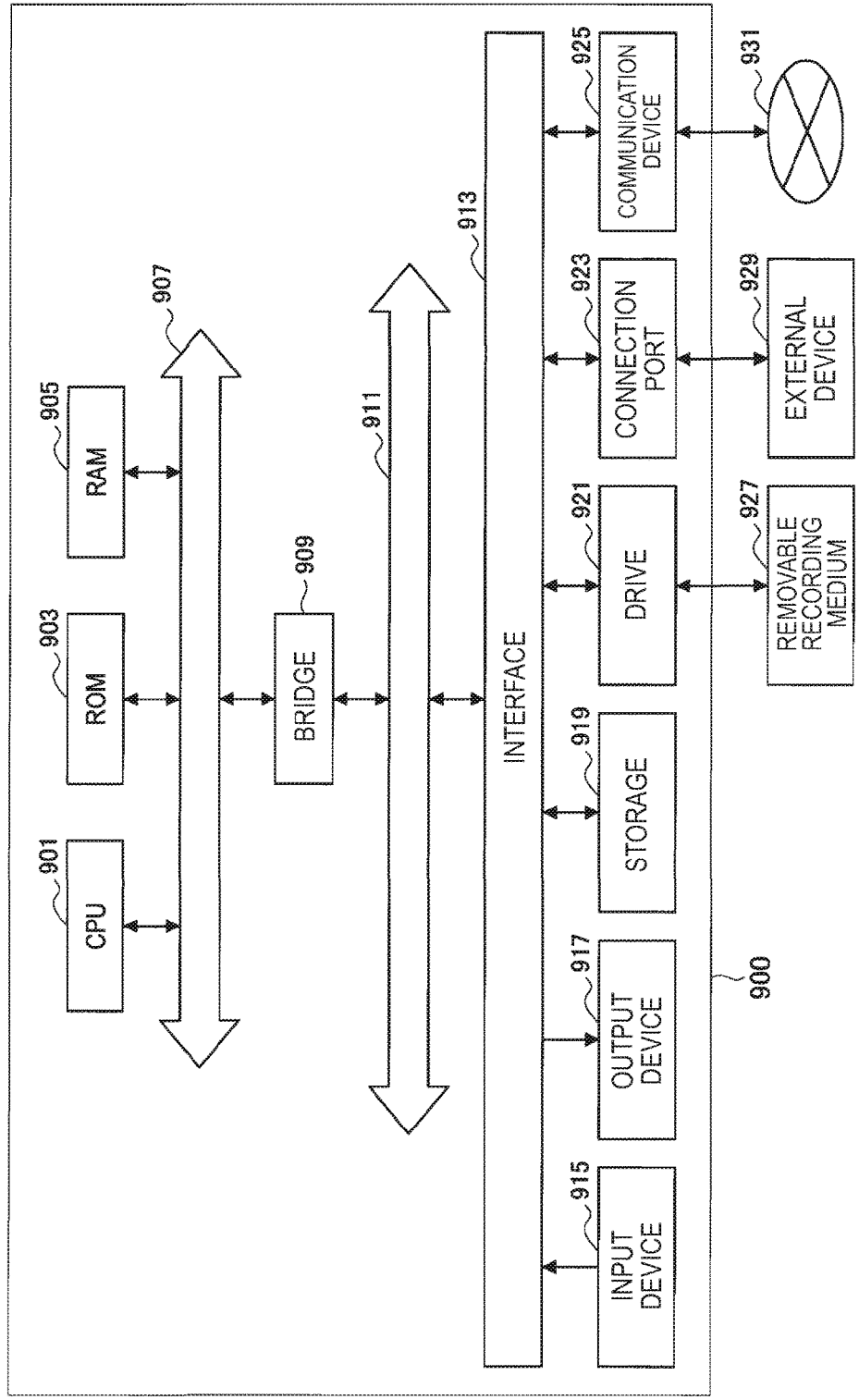
FIG. 13 is a block diagram showing an example of a hardware configuration of an information processing device relating to an embodiment of the present disclosure.

Next, with reference to FIG. 13, a hardware configuration of an information processing device according to an embodiment of the present disclosure is described. FIG. 13 is a block diagram illustrating a hardware configuration example of the information processing device according to the embodiment of the present disclosure. An illustrated information processing device 900 may achieve the client device 100, the management server 200, or the content server 300 in the above described embodiment.

The information processing device 900 includes a central processing unit (CPU) 901, read only memory (ROM) 903, and random access memory (RAM) 905. In addition, the information processing device 900 may include a host bus 907, a bridge 909, an external bus 911, an interface 913, an input device 915, an output device 917, a storage 919, a drive 921, a connection port 923, and a communication device 925. The information processing device 900 may include a processing circuit such as a digital signal processor (DSP) or an application-specific integrated circuit (ASIC), instead of or in addition to the CPU 901.

The CPU 901 functions as an arithmetic processing device and a control device, and controls the overall operation or a part of the operation of the information processing device 900 according to various programs recorded in the ROM 903, the RAM 905, the storage 919, or a removable recording medium 927. The ROM 903 stores programs, operation parameters, and the like used by the CPU 901. The RAM 905 transiently stores programs used when the CPU 901 is executed, and parameters that change as appropriate when executing such programs. The CPU 901, the ROM 903, and the RAM 905 are connected with each other via the host bus 907 configured from an internal bus such as a CPU bus or the like. The host bus 907 is connected to the external bus 911 such as a Peripheral Component Interconnect/Interface (PCI) bus via the bridge 909.

The input device 915 is a device operated by a user such as a mouse, a keyboard, a touchscreen, a button, a switch, and a lever. The input device 915 may be a remote control device that uses, for example, infrared radiation and another type of radio waves. Alternatively, the input device 915 may be an external device 929 such as a mobile phone that corresponds to an operation of the information processing device 900. The input device 915 includes an input control circuit that generates input signals on the basis of information which is input by a user to output the generated input signals to the CPU 901. The user inputs various types of data and indicates a processing operation to the information processing device 900 by operating the input device 915.

The output device 917 includes a device that can visually or audibly report acquired information to a user. The output device 917 may be, for example, a display device such as a liquid crystal display (LCD), a plasma display panel (PDP), and an organic electro-luminescence (EL) display, an audio output device such as a speaker and a headphone, and a printer. The output device 917 outputs a result obtained through a process performed by the information processing device 900, in the form of text or video such as an image, or sounds such as voice and audio sounds.

The storage 919 is a device for data storage that is an example of a storage unit of the information processing device 900. The storage 919 includes, for example, a magnetic storage device such as a hard disk drive (HDD), a semiconductor storage device, an optical storage device, or a magneto-optical storage device. The storage 919 stores therein the programs and various data executed by the CPU 901, and various data acquired from an outside.

The drive 921 is a reader/writer for the removable recording medium 927 such as a magnetic disk, an optical disc, a magneto-optical disk, and a semiconductor memory, and built in or externally attached to the information processing device 900. The drive 921 reads out information recorded on the mounted removable recording medium 927, and outputs the information to the RAM 905. The drive 921 writes the record into the mounted removable recording medium 927.

The connection port 923 is a port used to directly connect external devices to the information processing device 900. The connection port 923 may be a Universal Serial Bus (USB) port, an IEEE1394 port, or a Small Computer System Interface (SCSI) port, for example. The connection port 923 may also be an RS-232C port, an optical audio terminal, a High-Definition Multimedia Interface (HDMI (registered trademark)) port, and so on. The connection of the external device 929 to the connection port 923 makes it possible to exchange various kinds of data between the information processing device 900 and the external device 929.

The communication device 925 is a communication interface including, for example, a communication device for connection to a communication network 931. The communication device 925 may be, for example, a wired or wireless local area network (LAN), Bluetooth (registered trademark), or a communication card for a wireless USB (WUSB). The communication device 925 may also be, for example, a router for optical communication, a router for asymmetric digital subscriber line (ADSL), or a modem for various types of communication. For example, the communication device 925 transmits and receives signals in the Internet or transits signals to and receives signals from another communication device by using a predetermined protocol such as TCP/IP. The communication network 931 to which the communication device 925 connects is a network established through wired or wireless connection. The communication network 931 is, for example, the Internet, a home LAN, infrared communication, radio wave communication, or satellite communication.

The example of the hardware configuration of the information processing device 900 has been described. Each of the structural elements described above may be configured by using a general purpose component or may be configured by hardware specialized for the function of each of the structural elements. The configuration may be changed as necessary in accordance with the state of the art at the time of working of the present disclosure.

5. Supplement

The embodiments of the present disclosure may include, for example, the above-described information processing device (a client device or a server), system, an information processing method executed by the information processing device or the system, a program for causing the information processing device to exhibit its function, and a non-transitory tangible medium having the program stored therein.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A client device including:

a cache in which a source of content is stored;

a cache information transmitting unit configured to transmit information indicating the source stored in the cache to a server managing a group of client devices capable of communicating without using an external network;

an external cache acquiring unit configured to acquire, from other client devices in the group, sources of content requested to be output based on information provided by the server; and a source acquiring unit configured to, when at least a part among the sources of the content requested to be output is not acquired from the other client devices, acquire the unacquired source from a content server through the external network.

(2)

The client device according to (1), wherein the information provided by the server includes IDs of the other client devices.

(3)

The client device according to (2), wherein the information provided by the server includes a list of sources cached by the client devices in the group, the list being provided prior to the output request.

(4)

The client device according to (2), further including:

an ID acquiring unit configured to transmit a request including IDs of the sources of the content requested to be output to the server when the output is requested, and acquire the information including the IDs of the other client devices transmitted by the server in response to the request.

(5) The client device according to any one of (1) to (4),
wherein, when the client device joins the group, the cache information transmitting unit transmits the information indicating the source stored in the cache to the server.

(6) The client device according to any one of (1) to (4),
wherein the cache information transmitting unit transmits the information indicating the source stored in the cache to the server regardless of whether or not the client device is in the group, and
the client device further includes a group joining processing unit configured to validate the information transmitted to the server when the client device joins the group.

(7) A server including:
a group managing unit configured to manage a group of client devices capable of communicating without using an external network;
a cache information receiving unit configured to receive information indicating sources of content cached by the client devices in the group; and
a cache information providing unit configured to provide a client device with information for the client device to acquire a source of content requested to be output from another client device in the group.

(8) The server according to (7),
wherein the cache information providing unit provides information including an ID of the other client device.

(9) The server according to (8),
wherein the cache information providing unit provides a list of sources cached by the client devices in the group, prior to the output request.

(10) The server according to (8),
wherein the cache information providing unit provides the information including the ID of the other client device in response to a request including an ID of the source of the content requested to be output.

(11) The server according to any one of (7) to (10),
wherein, when the client device joins the group, the cache information receiving unit receives information indicating a source of content cached by the client device.

The server according to any one of (7) to (10),
wherein the cache information receiving unit receives information indicating a source of content cached by the client device regardless of whether or not the client device is in the group, and
the group managing unit validates the received information when the client device joins the group.

(13) The server according to any one of (7) to (12),
wherein the group managing unit shares information on the client devices in the group and the information on the sources of the content cached by the client devices with a different server managing the group.

(14) A recording medium storing a program for causing a processor of a client device including a cache storing a source of content to implement:

a function of transmitting information indicating the source stored in the cache to a server managing a group of client devices capable of communicating without using an external network;
a function of acquiring sources of content requested to be output from other client devices in the group based on information provided by the server; and
a function of acquiring, when at least a part among the sources of the content requested to be output is not acquired from the other client devices, the unacquired source from a content server through the external network.

(15) An information processing method including:
managing, by a processor, a group of client devices capable of communicating without using an external network;
receiving information indicating sources of content cached by client devices in the group; and
providing a client device with information for the client device to acquire a source of content requested to be output from another client device in the group.

REFERENCE SIGNS LIST 10, 20, 30 system
100 client device
102 communication unit
104 source acquiring unit
106 external cache acquiring unit
108 internal cache acquiring unit
110 external cache DB
112 cache
114 content outputting unit
116 group joining processing unit
118 cache list transmitting unit
120 external cache list receiving unit
122 device ID acquiring unit
150 group
200 management server
202 communication unit
204 cache list receiving unit
206 group managing unit
208 cache list updating unit
210 intragroup cache DB
212 cache list transmitting unit
214 device ID transmitting unit
300 content server

The invention claimed is:

1. A client device comprising:
circuitry at least including a processor and a cache in which first content data is stored, the circuitry configured to:
transmit first information indicating the first content data stored in the cache to a server, which manages a group of client devices including the client device and other client devices, the group of client devices being capable of communicating with each other without using an external network;
acquire, from the other client devices in the group, second content data requested to be output based on second information provided by the server, the second information including at least a timestamp indicating a time at which the second content data is stored in one of the other client devices; and
when at least a part of the second content data is not acquired from the other client devices, acquire the at least the part of the second content data from a content server through the external network.

2. The client device according to claim 1, wherein the second information provided by the server includes device IDs of the other client devices.

3. The client device according to claim 2, wherein the second information provided by the server includes a list of sources cached by the client devices in the group, the list being provided prior to the output request.

4. The client device according to claim 2, wherein the circuitry is further configured to:
transmit a request including content IDs of the second content data requested to be output to the server when the output is requested; and
acquire the second information including the device IDs of the other client devices transmitted by the server in response to the output request.

5. The client device according to claim 1, wherein, when the client device joins the group, the circuitry is further configured to transmit the first information indicating the first content data stored in the cache to the server.

6. The client device according to claim 1, wherein the circuitry is further configured to:
transmit the first information indicating the first content data stored in the cache to the server regardless of whether or not the client device is in the group; and
validate the first information transmitted to the server when the client device joins the group.

7. A server comprising:
circuitry at least including a processor and a cache, the circuitry configured to:
manage a group of client devices capable of communicating with each other without using an external network;
receive first information indicating content data cached by the client devices in the group; and
provide a client device of the group with second information for the client device to acquire, from another client device in the group, at least one of the content data requested to be output, the second information including a timestamp indicating a time at which the at least one of the content data is stored in the other client device.

8. The server according to claim 7, wherein the circuitry is further configured to provide the second information including a device ID of the other client device.

9. The server according to claim 8, wherein the circuitry is further configured to provide the second information including a list of sources cached by the client devices in the group, prior to the output request.

10. The server according to claim 8, wherein the circuitry is further configured to provide the second information including the device ID of the other client device in response to a request including a content ID of the at least one of the content data requested to be output.

11. The server according to claim 7, wherein, when the client device joins the group, the circuitry is further configured to receive another information indicating another content data cached by the client device.

12. The server according to claim 7, wherein the circuitry is further configured to:
receive another information indicating another content data cached by the client device regardless of whether or not the client device is in the group; and
validate the received other information when the client device joins the group.

13. The server according to claim 7, wherein the circuitry is further configured to share the first information with the client devices in the group and another server managing the group.

14. A non-transitory computer readable medium storing a program, when executed by a processor of a client device including a cache storing first content data, causes the client device to perform a method comprising:
transmitting first information indicating the first content data stored in the cache to a server, which manages a group of client devices including the client device and other client devices, the group of client devices being capable of communicating with each other without using an external network;
acquiring, from the other client devices in the group, second content data requested to be output based on second information provided by the server, the second information including at least a timestamp indicating a time at which the second content data is stored in one of the other client devices; and
acquiring, when at least a part of the second content data is not acquired from the other client devices, the at least the part of the second content data from a content server through the external network.

15. An information processing method comprising:
managing, by a processor, a group of client devices capable of communicating with each other without using an external network;
receiving first information indicating content data cached by the client devices in the group; and
providing a client device of the group with second information for the client device to acquire, from another client device in the group, at least one of the content data requested to be output, the second information including a timestamp indicating a time at which the at least one of the content data is stored in the other client device.

* * * * *